(12) United States Patent
Cuccinelli, Jr. et al.

(10) Patent No.: US 11,055,321 B2
(45) Date of Patent: Jul. 6, 2021

(54) RULES BASED ALBUMS (71) Applicant: GNOMMME LLC, Boston, MA (US)

(72) Inventors: Joseph C. Cuccinelli, Jr., Needham, MA (US); David Benaim, Newton Centre, MA (US); Andrew P. Goldfarb, Brookline, MA (US); Gerald Hewes, Lexington, MA (US)

(73) Assignee: Photo Butler, Inc., Boston, MA (US)

(*) Notice: Subject to any disclaimer, the term of this patent is extended or adjusted under 35 U.S.C. 154(b) by 5 days.

(21) Appl. No.: 15/818,614

(22) Filed: Nov. 20, 2017

(65) Prior Publication Data

US 2018/0144045 A1 May 24, 2018

Related U.S. Application Data (60) Provisional application No. 62/425,579, filed on Nov. 22, 2016.

(51) Int. Cl.
G06F 16/28 (2019.01)
G06F 16/48 (2019.01)
G06F 16/45 (2019.01)

(52) U.S. Cl.
CPC .......... *G06F 16/287* (2019.01); *G06F 16/45* (2019.01); *G06F 16/48* (2019.01)

(58) Field of Classification Search
CPC ......... G06F 16/287; G06F 16/45; G06F 16/48
See application file for complete search history.

(56) References Cited

U.S. PATENT DOCUMENTS

| 7,734,700 | B2 | 6/2010 | Johns et al. | |
| 8,913,152 | B1* | 12/2014 | Carceroni | G06T 11/60 348/222.1 |
| 10,387,514 | B1* | 8/2019 | Yang | G06F 16/22 |
| 2004/0004663 | A1 | 1/2004 | Kahn et al. | |
| 2005/0097173 | A1* | 5/2005 | Johns | G06Q 10/107 709/206 |
| 2013/0066872 | A1* | 3/2013 | Moritz | G06F 16/50 707/737 |
| 2013/0148864 | A1* | 6/2013 | Dolson | G06F 16/58 382/115 |
| 2014/0085443 | A1* | 3/2014 | Sathish | H04N 21/23418 348/61 |
| 2015/0261752 | A1 | 9/2015 | Li et al. | |

(Continued)

FOREIGN PATENT DOCUMENTS

WO WO-2016046841 A1 * 3/2016 ............ H04N 21/252

OTHER PUBLICATIONS

"PhotoSpring introduces world's first completely automated digital photo album with digital assistant: Automatically gather, organize, select, display, and share photos and videos" (Sep. 23, 2015). PR Newswire. Retrieved from https://dialog.proquest.com/professional/docview/1715643939?accountid=131444 (Year: 2015).*

(Continued)

*Primary Examiner* — James E Richardson
(74) *Attorney, Agent, or Firm* — Danielson Legal LLC (57) ABSTRACT Methods and systems for organizing media. The systems and methods described herein organize media items based on metadata and unique media item content attributes. If a media item satisfies one or more criteria, the media item is transferred to an album to be shared with authorized users.

20 Claims, 5 Drawing Sheets (56) References Cited

U.S. PATENT DOCUMENTS

| | | | | |
|---|---|---|---|---|
| 2015/0331861 A1* | 11/2015 | Tai | ................... | G06K 9/00677 |
| | | | | 707/613 |
| 2016/0117344 A1* | 4/2016 | Kleinpeter | .......... | G06F 16/1748 |
| | | | | 707/692 |
| 2016/0316012 A1* | 10/2016 | Chen | .................. | G06K 9/00248 |
| 2017/0046350 A1* | 2/2017 | Lunsford | .............. | G06F 16/287 |
| 2017/0054858 A1* | 2/2017 | Coelho | .............. | G01N 27/4146 |

OTHER PUBLICATIONS

"Automatically Organize New & Existing Photos into Specific Albums on your iPhone" Youtube..com (Mar. 6, 2014) Accessible https://www.youtube.com/watch?v=NN3j4nXj21w.

"Google Photos." Google. (May 2015). Accessible at https://photos.google.com/.

"Photato—Photo Organizer." Amazon.com Services LLC. (Dec. 22, 2014) Accessible at https://play.google.com/store/apps/details?id=com.twoletters.photato&hl=en.

\* cited by examiner

FIG. 5

RULES BASED ALBUMS

CROSS REFERENCE TO RELATED APPLICATIONS

The present application claims the benefit of U.S. provisional application No. 62/425,579, filed on Nov. 22, 2016, the entire disclosure of which is incorporated by reference as if set forth in its entirety herein.

TECHNICAL FIELD

Embodiments described herein generally relate to systems and methods for organizing media items and, more particularly but not exclusively, to systems and methods for organizing media items based on one or more criteria.

BACKGROUND

File sharing techniques have become available that help people perform a variety of actions. These techniques help people automatically organize their media items, privately share their media items, and view media items via digital keepsakes. However, the techniques by which people and other entities distribute or otherwise share media items such as photos and videos have yet to be perfected.

An example of a sharing application is the FACEBOOK® MOMENTS Application which suggests photos to share based on visual recognition techniques. This application executes a single, hard coded rule that suggests a photo for sharing that includes two or more connected users.

The VERI® platform allows users to use their normal cameras (e.g., without downloading a specific application or service) to take photos. The platform then instantly autoshares their photos as soon as they are taken during a timeframe.

Other available techniques let consumers invite people to access an album and informs those invitees when content is added. However, the user that is sharing the album must manually select which media items to include.

Although the techniques described above make it easier to find content to share and provide a private and secure way of sharing, they still require a manual workflow. These techniques require consumers to select what they want to share—whether it be picking photos/videos or editing a precompiled album or slideshow before sharing.

A need exists, therefore, for systems and methods for organizing media items that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for organizing media. The method includes receiving, using an interface, at least one criteria for selecting at least one media item from a first user, each criteria being associated with an album; receiving, using the interface, at least one media item; autonomously selecting, using a media analysis module, at least one media item that satisfies the at least one received criteria; and autonomously transferring the at least one selected media item to the album associated with the satisfied criteria.

In some embodiments, the at least one criteria includes at least one of an event, the presence of an object, the absence of an object, a location, a time of interest, a date of interest, a calendar event, a person of interest, and an exclusion criteria.

In some embodiments, the at least one media item is a photograph or a video.

In some embodiments, the at least one media item is associated with a plurality of albums.

In some embodiments, the method further includes receiving contact information for a second user, wherein the contact information includes at least one of an email address, a social media username, and a telephone number. In some embodiments, the method further includes sharing a link to the album with the second user. In some embodiments, the method further includes communicating a notification to the second user indicating that the at least one selected media item has been transferred to the album. In some embodiments, the method further includes receiving at least one media item from the second user; autonomously selecting, using the media analysis module, at least one media item from the second user that satisfies the at least one received criteria; and autonomously transferring the at least one selected media item from the second user to the album.

In some embodiments, the method further includes autonomously identifying, using the media analysis module, a newly-received media item that satisfies the at least one received criteria, wherein the identified newly-received media item is autonomously transferred to the album in at least substantially real time. In some embodiments, the newly-received media item is added to the album by a second user after the album is shared with the second user.

In some embodiments, the method further includes receiving, using the interface, a modification to the at least one criteria; and autonomously updating the media items in the album based on the modification to the at least one criteria.

According to another aspect, embodiments relate to a system for organizing media. The system includes an interface configured to receive at least one media item and at least one criteria for selecting at least one media item from a first user, each criteria being associated with an album; a memory; and a processor executing instructions stored on the memory to provide a media analysis module configured to autonomously select at least one media item that satisfies the at least one criteria, wherein the at least one selected media item is transferred to the album associated with the satisfied criteria.

In some embodiments, the at least one criteria includes at least one of an event, the presence of an object, the absence of an object, a location, a time of interest, a date of interest, an occasion, a calendar event, a person of interest, and an exclusion criteria.

In some embodiment, the at least one media item is a photograph or a video.

In some embodiments, the at least one media item is associated with a plurality of albums.

In some embodiments, the interface is further configured to receive contact information for a second user, wherein the contact information includes at least one of an email address, a social media username, and a telephone number. In some embodiments, the interface is configured to share a link to the album with the second user. In some embodiments, the interface is further configured to communicate a notification indicating that the at least one selected media item has been transferred to the album.

In some embodiments, the media analysis module is further configured to autonomously identify a newly-received media item that satisfies the at least one received criteria, wherein the identified newly-received media item is autonomously transferred to the album in at least substantially real time.

In some embodiments, the interface is further configured to receive a modification to the at least one criteria; and the media analysis module is configured to autonomously update media items in the album based on the modification to the at least one criteria.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), flash memories, EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Various embodiments described herein disclose novel techniques to provide rules-based media albums. In accordance with various embodiments, users may define rules to populate albums based on one or more attributes or criteria.

These criteria may include or otherwise be based on, for example, people, place, events, occasion, and time range thereby allowing a user to control how and what content is shared.

In operation, a user may define criteria such that, if a media item satisfies the criteria, the media item is automatically transferred to an album. The user may also share the album with certain other users (e.g., friends or family). As the user adds media items, the sharing recipients are notified and the album content is updated. Accordingly, the systems and methods described herein automate the collection and sharing of media items.

Figure 1:
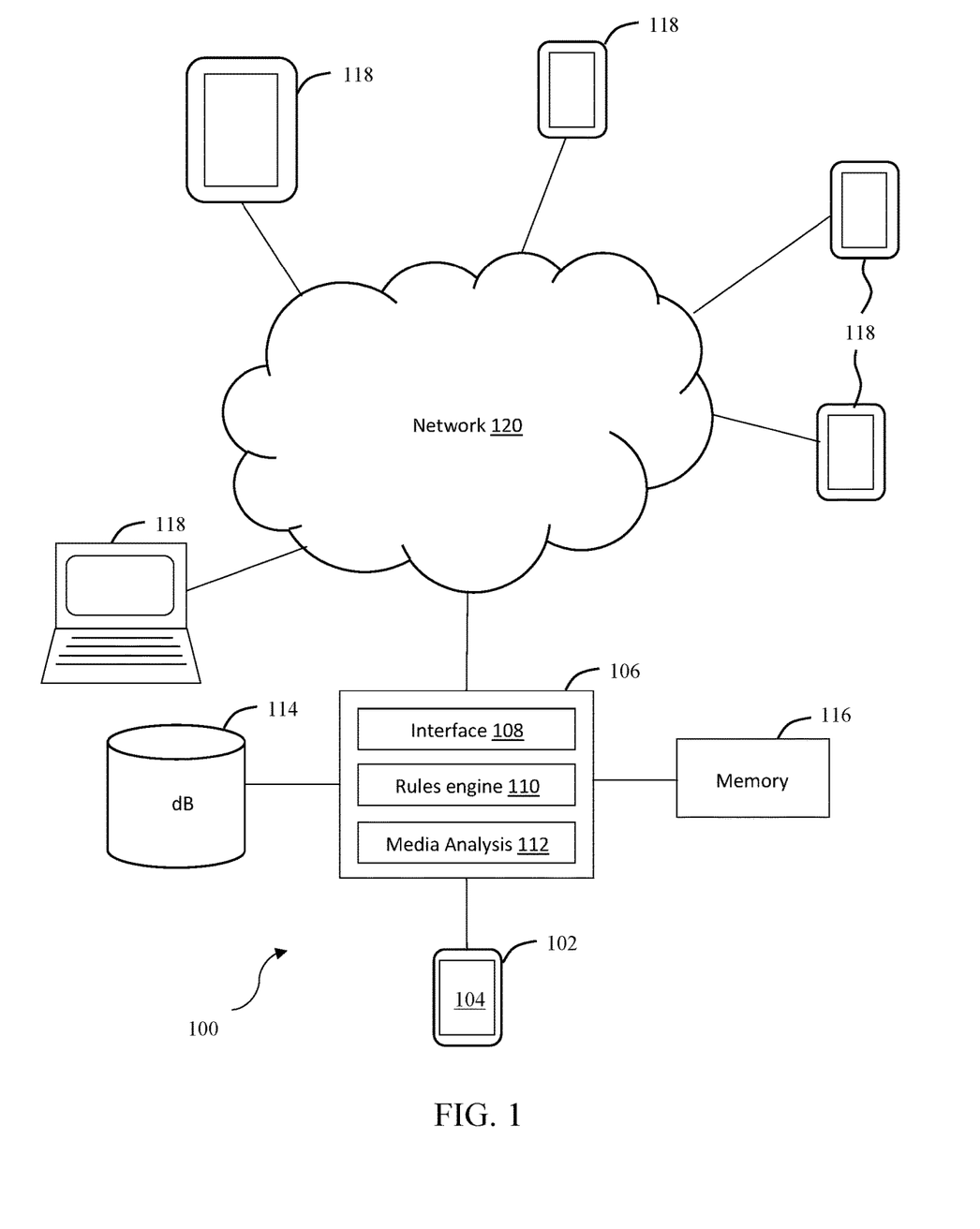
FIG. 1 illustrates a system for organizing media in accordance with one embodiment.

FIG. 1 illustrates a system 100 for organizing media in accordance with one embodiment. The system 100 may include a user device 102 executing a user interface 104 that is operated by a first user. The user device 102 may be in communication with a processor 106 that executes or otherwise includes a processor interface 108, a rules engine 110, and a media analysis module 112. The processor 106 may also be in communication with one or more databases 114 and memory 116.

The user device 102, the processor 106, and other user devices 118 may be in communication with each other over one or more networks 120. The user devices 118 may be operated by other users (e.g., such as the first user's friends and/or family). These other users may operate their respective user devices 118 to view content shared by the first user and other users.

The user device 102 (and user devices 118) may be configured as any type of device that is capable of gathering or at least receiving one or more media items. These media items may include photographs, videos, mini clips, animated photographs, motion photos, or the like. Accordingly, the user devices 102 may be any type of device capable of gathering these types of items. These devices may include smartphones, tablets, laptops, smart watches, or any other type of device configured or otherwise in operable communication with a media gathering device (e.g., a camera) to receive the gathered media item(s).

The present application largely describes embodiments in which the operator of user device 102 gathers and shares media items and the remaining users view the media items. However, in some embodiments, more than one user may contribute their own media items for sharing, as discussed below.

In various embodiments the sharing can be bi-directional. Members of an album can be viewers (i.e., not contributing media items), or contributors (in which case they contribute their media items and may view other media items). As a contributor, a user may gather media items that, if they satisfy an album rule, will be transferred to the album so that all other users (viewers and other contributors) may view the media items.

When a user creates or shares an album, he can indicate if they want a certain user to be a contributor or just a viewer. If the other person is invited to be an album member, he or she can accept as a contributor or only as a viewer. At a later date, he or the album creator may change his status.

The user interface 104 executing on the user device 102 may be an application that allows a user to capture and view media items. The application may also allow a user to define the one or more criteria associated with an album for selecting media items to be transferred to the album.

Additionally, those with access to an album may provide feedback related to whether a media item satisfies one or more defined rules. For example, any user (or only users with certain privileges) may recognize that a Hanukkah media item was incorrectly transferred to a "Christmas" themed album. The user or users may also indicate that this item should be transferred to a Hanukkah album. This information can be used to improve the operation of the classifiers discussed below.

Referring back to FIG. 1, the network(s) 120 may link the various devices with various types of network connections. The network(s) 120 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 120 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, a Long-Term Evolution-based link (LTE), 5th generation mobile networks, or an IEEE 802.11-based link.

The memory 116 may be L1, L2, L3 cache or RAM memory configurations. The memory 116 may include non-volatile memory such as flash memory, EPROM, EEPROM, ROM, and PROM, or volatile memory such as static or dynamic RAM, as discussed above. The exact configuration/type of memory 116 may of course vary as long as instructions for at least analyzing the media items can be executed by the media analysis module 112 to accomplish the features of various embodiments described herein.

The database(s) 114 may store media items and other data related to, for example, certain people (e.g., their facial features), places, calendar events (and items associated with calendar events), or the like. In other words, the database(s) 114 may store data regarding specific people or other entities such that the media analysis module 112 can recognize these people or entities in the gathered media items. The exact type of data stored in the database(s) 114 may vary as long as the features of various embodiments described herein may be accomplished.

The processor 106 may be any hardware device capable of executing the rules engine 110 and the media analysis module 112. The processor 106 may be a microprocessor, a field programmable gate array (FGPA), an application-specific integrated circuit (ASIC), graphics processing units (GPUs), Neural Network/Tensor accelerators, or other similar device.

In some embodiments, such as those relying on one or more ASICs, the functionality described as being provided in part via software may instead be configured into the design of the ASICs and, as such, the associated software may be omitted. The processor 106, as well as any components thereof, may be configured as part of the devices 102/118 on which the user interface 104 executes, such as a mobile device, or may be located at some remote location (e.g., a cloud-based service). In other words, the applicable computing logic can be mostly (or entirely) on the user device 102, or it may be mostly on a server separate from the user device 102.

The processor interface 108 may receive media items from the user device 102 in a variety of formats. These media items may be sent via any suitable protocol or application such as, but not limited to, email, SMS text message, iMessage, Whatsapp, Facebook, Instragram, Snapchat, etc. The interface 108 may then communicate the media items to the media analysis module 112.

The rules engine 110 may be in communication with the interface 108 and allow a user to define one or more criteria (i.e., rules) for selecting media items for association with an album and subsequent sharing.

Users may have a variety of options for defining criteria to select which media items are transferred to an album. For example, a user may want an album to include photos and videos of their friends Lucy and Caroline on Nantucket during the upcoming summer. Or, they may want an album to only include photos and videos of Jack during all previous Christmas seasons and all future Christmas seasons.

Additionally, the rules engine 110 may load templates previously stored in the database 114 that provide proprietary filters to help users populate their albums. For example, the database 114 may include a Graduation rules-based album template. If this template is selected, the media analysis module 112 (discussed below) may select and transfer to an album media items that include objects such as a mortar board, a podium, a diploma, and other relevant graduation-related objects.

Other rules and metadata may be considered as well. For example, the Graduation rules-based template may include media items taken at a point of interest (POI) (e.g., at or near a school), media items that include the presence of a school name, media items that include a person that is graduating, etc.

As another example, the database 114 may include a Sports rules-based album template. If this template is selected, the media analysis module 112 may select and transfer to an album media items that include soccer balls, baseballs, bats, lacrosse sticks, hockey sticks, basketball hoops, referees (e.g., a person wearing black and white stripes), fields, courts, hockey rinks, gymnasiums, golf courses, or the like.

Other rules and metadata may be considered as well. For example, the sports rules-based album template may include media items with many kids present, recurring time frames of when media items are taken (e.g., Saturday morning soccer practices), and POI data that indicates or suggests the media item was taken at a field, school, or gymnasium.

As another example, the database 114 may include a Concert rules-based template. If this template is selected, the media analysis module 112 may select and transfer to an album media items that include objects such as, but not limited to, a concert stage, musical instruments, light shows, and dark, crowded scenes.

The user(s) may also set a time window such that media items gathered within a time period are automatically included or excluded from an album. This time window may be specified in the form of hours or specific dates, For example, a user may specify a time window (e.g., from 12:00-4:00 PM on July 4th), such that all media items that were or are gathered in that time window are automatically transferred to an album for sharing. This can be a forward-looking time window in which case all media items gathered in a future time window will automatically be transferred to an album, or a retroactive time window in which case all media items that were gathered in the past time window will be transferred to an album.

The rules engine 110 may allow a user to define a rule so that only media items that contain a certain person are included in an album. For example, a parent may set filters such that media items concerning each child are separated into the child's own respective album.

The rules engine 110 may also allow a user to define a rule so that only media items that were taken at a certain location are transferred to an album for sharing. The certain location may be specified as a town, establishment, business, park, neighborhood, or the like. For example, a user may specify or create a rule that all media items taken in Boston (and the surrounding 10 miles) are automatically transferred to an album for sharing.

Location information in a media item may be supplied by GPS associated with the user's user device 102. Additionally or alternatively, the media analysis module 112 may recognize certain landmarks in the gathered media items (e.g., specific buildings or natural landmarks) that are indicative of the location associated with the media item.

As another example, a user may specify an album criteria such that the rules engine 110 may select media items that were taken during or are otherwise associated with holidays. These types of criteria may be based on the identification of certain dates (e.g., December 25th), and/or the context of the gathered media item. For example, a "Christmas" context can be recognized not just by the time of year, but also by common objects in a scene such as a Christmas tree, Santa Claus-related décor, reindeers, wrapped presents, or the like. Similarly, a "Hanukkah" context can be recognized by detecting media items with a menorah, a dreidel, or the like.

A "birthday" context can be recognized by the presence of certain-birthday related items in a media item. These may include, but are not limited to, toys, presents, birthday cake, birthday candles, and other birthday-related items.

A "wedding" context can be recognized by detecting common wedding-related items. These may include, but are not limited to, a white bridal dress, wedding cake, a church ceremony, or the like.

The rules executed by the rules engine 110 may be continuously and autonomously improved based on user behavior and machine learning. For example, the rules engine 110 may update its rules based on the user removing media items from an album that were initially selected by the media analysis module 112 and/or based on the user adding media items to a folder that were initially omitted and/or based on the media items in a folder viewed by the user.

The rules engine 110 may also recognize the temporal proximity of certain media items with respect to other media items. Therefore, not all context-based items are required in a media item for that media item to satisfy a specified criteria for inclusion in an album. For example, if a portrait of child is taken between two pictures of a birthday cake, the portrait may still be recognized as part of the birthday context and selected for inclusion in a birthday album.

The rules engine 110 may also identify certain contexts as inappropriate. For example, it may be desirable to prevent media items with inappropriate or sexually explicit matter from being shared. Accordingly, the rules engine 110 may be pre-configured to automatically exclude media items that appear to contain nudity, for example.

Additionally, the rules engine 110 may allow a user to define certain criteria that, if present in a media item, prevent the media item from being shared. For example, a user may create a rule to prevent all media items containing alcohol from being shared.

As discussed above, the rules engine 110 may continuously improve based on recognized preferences of a user. The rules engine 110 may also make suggestions based on media items manually removed or added to an album.

For example, if a user has manually removed media items with alcohol, the rules engine 110 may instruct the user interface 104 to present a message along the lines of "We noticed that you have been removing pictures with alcohol in them, would you like us to add 'alcohol' to the exclusion list?" The user may then enter a command instructing the rules engine 110 to exclude media items containing alcohol. This feature may also be applied in scenarios in which a user manually adds or removes media items that contain objects or people.

In some cases, a single media item may be transferred to or otherwise associated with more than one album. For example, one album may be reserved to store media items from Christmas of a certain year. Another album may be reserved to store media items containing a certain person. A single media item that contains an image of this person on Christmas may therefore be associated with both albums.

Figure 2:
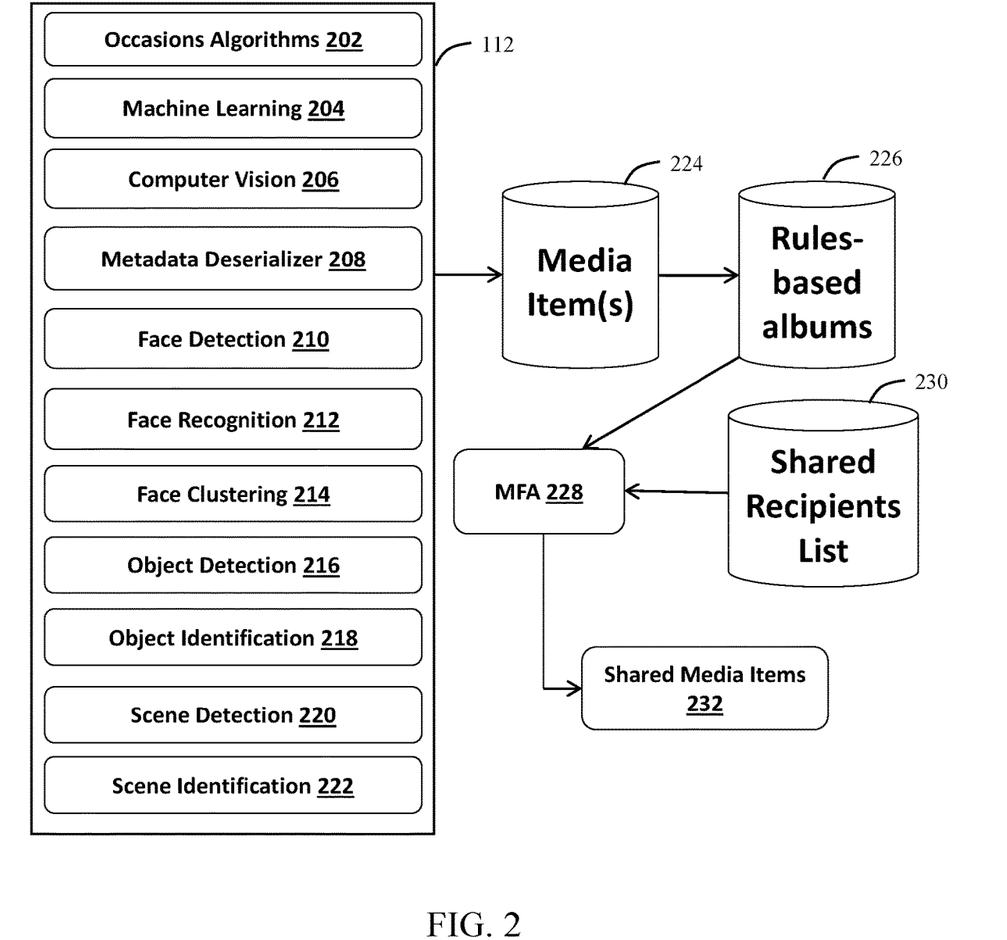
FIG. 2 illustrates the media analysis module of FIG. 1 transferring media item(s) for sharing in accordance with one embodiment.

FIG. 2 illustrates various components of the media analysis module 112 in accordance with one embodiment. These components may include, but are not limited to, occasions algorithms 202, a machine learning module 204, a computer vision module 206, a metadata deserializer 208, a face detection module 210, a facial recognition module 212, a face clustering module 214, an object detection module 216, an object identification module 218, a scene detection module 220, and a scene identification module 222

Any of these components of the media analysis module 112 may, alone or in some combination, analyze the received user media item(s) 224 to determine if the media item(s) 224 satisfy one or more specified rules processed by the rules engine 110.

The occasions algorithms 202 may include algorithms that recognize certain dates, calendar events, or other types of occasions such as those defined by the previously-discussed templates. These may recognize, for example, certain calendar dates that correspond to holidays.

The machine learning module 204 may implement a variety of machine learning procedures to classify the contents of certain media items and to learn about the media items, their content, and the users' behavior related to the media items. Accordingly, the machine learning module 204 may implement supervised machine learning techniques as well as unsupervised machine learning techniques.

The computer vision module 206 may implement a variety of vision techniques to analyze the content of the gathered media item(s). These techniques may include, but are not limited to, scale-invariant feature transform (SIFT), speeded up robust feature (SURF) techniques, or the like. The exact techniques used may vary as long as they can analyze the content of the media item(s) 224 to accomplish the features of various embodiments described herein.

Computer vision tags may include, but are not limited to, water, nature, no person, person, desktop, outdoors, ocean, summer, sea, sun, panoramic, color, travel, beautiful, bright, fair weather, winter, abstract, vacation, art, or the like. These tags may help classify or otherwise group media items according to their content.

The metadata deserializer 208 may receive a variety types of metadata (e.g., in a serialized form). This data may include, but is not limited to, EXIF data that specifies the formats for the gathered media items. The deserializer 208 may then deserialize the received metadata into its deserialized form.

The face detection module 210 may execute a variety of facial detection programs to detect the presence of faces (and therefore people) in various media items. The programs may include or be reliant on OPENCV, for example. Again, these programs may execute on the user device 102 and/or on a server at a remote location. The exact techniques or programs may vary as long as they can detect facial features in media items to accomplish the features of various embodiments described herein.

The face recognition module 212 may execute a variety of facial recognition programs to identify certain people in various media items. The face recognition module 212 may be in communication with one or more databases 114 that store data regarding people and their facial characteristics. The face recognition module 212 may use geometric-based approaches and/or photometric-based approaches, and may use techniques based on principal component analysis, linear discriminant analysis, elastic bunch graph matching, HMM, multilinear subspace learning, or the like.

Face attributes detected by either the face detection module 210 or the face recognition module 212 may include, but are not limited to, Hasglasses, Hassmile, age, gender, and face coordinates for: pupilLeft, pupilRight, noseTip, mouthLeft, mouthRight, eyebrowLeftOuter, eyebrowLeftInner, eyeLeftOuter, eyeLeftTop, eyeLeftBottom, eyeLeftInner, eyebrowRightInner, eyebrowRightOuter, EyeRightInner, eyeRightTop eyeRightBottom, eyeRightOuter, noseRootLeft, noseRootRight, noseLeftAlarTop, noseRightAlarTop, noseLeftAlarOutTip, noseRightAlarOutTip, upperLipTop, upperLipBottom, underLipTop, underLipBottom.

The face clustering module 214 may, once the face recognition module 212 identifies a certain person in a media item 224, group the item 216 as being part of an album associated with one or more people. That is, the media item 224 may be one of many identified as including a certain person.

The object detection module 216 may detect various objects present in a media item 224. For example, the object detection module 216 may execute one or more of various techniques (e.g., using the computer vision module 206) to distinguish between an object in a media item 224 and the background of the media item 224.

The object identification module 218 may then classify or otherwise recognize the object as a certain item. For example, the object identification module 218 may analyze objects (e.g., by their shape, size, color, etc.) to determine if they satisfy one or more criteria. The object identification module 218 may also compare data regarding the detected objects (e.g., their shape and size) to data in the database 114 to determine if the detected object matches an object stored in the database 114 and therefore satisfies one or more criteria.

The scene detection module 220 may gather data that corresponds to the scene of a media item 224. This may include data that indicates the context of a media item 224 such as whether the media item 224 includes people, was taken indoors, outdoors, during the day, during the night, etc.

The scene identification module 222 may be in communication with the scene detection module 220 and receive data regarding the scene of a media item 224. The scene identification module 222 may compare the received data to data in the database 114 to determine whether it is indicative of a certain context and therefore satisfies one or more criteria.

The data gathered by the various modules 202-222, alone or in some combination, may be analyzed by the rules engine 110. If, according to that analysis, the media item(s) 224 satisfy the rules corresponding to an album, the media item(s) 224 will be associated with the album(s) 226.

Embodiments of the systems and methods described herein may include a multi-factor authentication (MFA) module 228 (which may be part of the processor 106, for example). The MFA 228 may require any number of credentials for a certain user to access an album.

Accordingly, the MFA 228 may be in communication with a shared recipients list 230, which may be stored in a database 114. The credentials may include names, emails, social media usernames, and passwords, for example—the combination of which may be stored in the database 114 to indicate that a particular user is an authorized user with permission to view and/or contribute to an album. These list(s) may be entered by a user via the user interface 104.

Once the MFA 228 recognizes that a certain user is an authorized user, the media item(s) 224 may be shared with the user. The user may receive a notification such as a text or email that the media item(s) 224 has been added to an album. Additionally, the user may receive a link directing the user to the location of the album and the recently added media item(s) 232.

Figure 3:
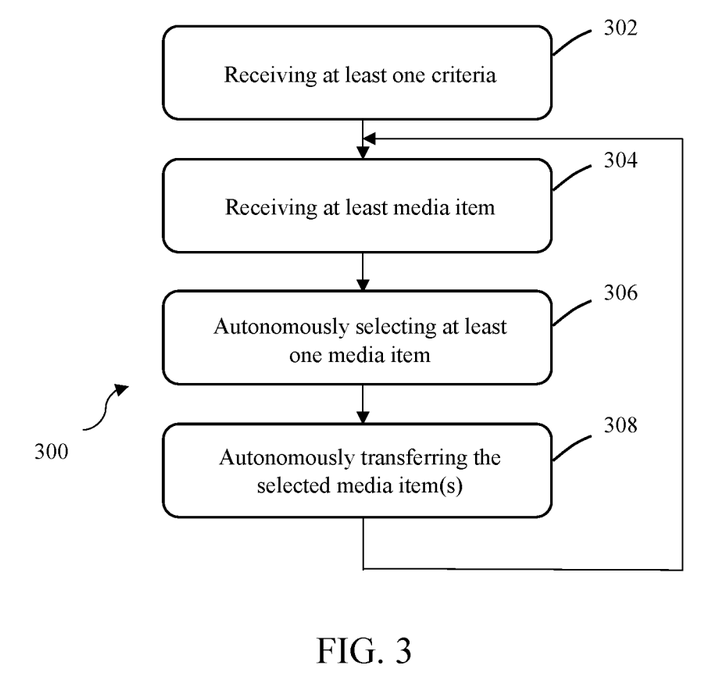
FIG. 3 depicts a flowchart of a method for organizing media in accordance with one embodiment.

FIG. 3 depicts a flowchart of a method 300 for organizing media in accordance with one embodiment. Step 302 involves receiving, using an interface, at least one criteria for selecting at least one media item from a first user, each criteria being associated with an album. The interface may be configured to execute on a user device such as the devices 102 or 118 of FIG. 1, for example.

As discussed above, the criteria may include at least one of an event, the presence of an object, the absence of an object, a location, a time of interest, a date of interest, a calendar event, a person of interest, and an exclusion criteria. If the first user wanted an album to include media items of a particular person, for example, then the criteria would be that the media item includes the person. If the first user wanted an album to include media items taken on Christmas, then the criteria would be that the media item was/is taken on Christmas. If the first user wanted to an album to include all media items of a particular person taken on Christmas, then the criteria would be that the media item includes the person and was taken on Christmas. These are only exemplary criteria, and it is contemplated that a user may define a number of criteria, in combination or individually, to populate an album.

Step 304 involves receiving, using the interface, at least one media item. The media item may include photographs, videos, animated photographs, or the like. The media item may be gathered by any suitable device such as mobile devices configured with any appropriate camera or other media item gathering devices. The gathered media item(s) may then be communicated to a media analysis module.

Step 306 involves autonomously selecting, using the media analysis module, at least one media item that satisfies the at least one received criteria. The media analysis module may execute a variety of modules to perform one or more of computer vision techniques, machine learning techniques, facial recognition techniques, GPS analysis, calendar analysis, time analysis, or the like to gather data regarding the media item.

Step 308 involves autonomously transferring the at least one selected media item to the album associated with the satisfied criteria. If the media analysis module determines that the gathered media item(s) satisfies the one or more specified criteria, it may transfer the media item(s) to one or more designated albums. If the media item(s) do not satisfy the criteria, they may be discarded or otherwise moved to a designated storage location.

Steps 304-308 may be iterated or otherwise looped. That is, a user may continuously gather media items that are analyzed with respect to the defined criteria. As the media analysis module determines that newly-received media items satisfy the criteria, the media analysis module will transfer the newly-received media items to the appropriate album.

Additionally or alternatively, the criteria may be retroactively applied to previously-gathered media items. For example, a user may update, modify, or otherwise define new criteria. The media analysis module may then analyze all or a subset of previously gathered or stored media items to determine if they satisfy the modified or newly-defined criteria. If so, they may be transferred to the appropriate album(s).

Similarly, modifying the criteria associated with an album may change which media items should be stored in the album. Accordingly, media items may be removed from an album if they no longer satisfy modified criteria.

Figure 4:
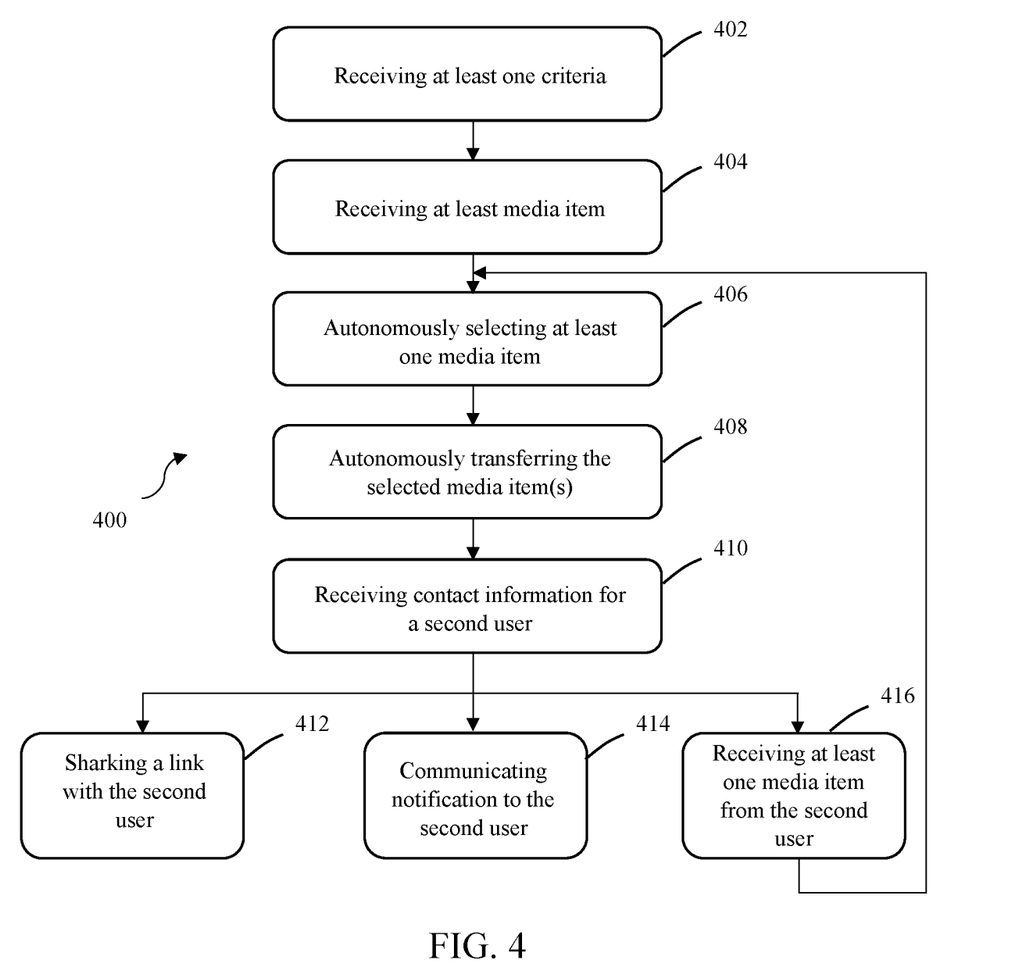
FIG. 4 depicts a flowchart of a method for organizing media in accordance with another embodiment.

FIG. 4 depicts a flowchart of a method 400 for organizing media in accordance with one embodiment. Steps 402-408 are similar to steps 302-308 of FIG. 3 and are not repeated here.

Step 410 involves receiving contact information for a second user. The second user may be a friend or family member of the first user, or any other person with whom the first user wants to share media items. The contact information may include any one or more of a name, email address, social media username, phone number, or the like. The contact information may then be stored in the database(s) 114 along with any other credentials.

Step 412 involves sharing a link with the second user. To share an album (or media items in general) with the second user, a processor interface such as the interface 108 of FIG. 1 or other type of component may communicate a link to the second user directing the second user to the album. The link may be shared over SMS, email, a push notification, social media, or the like. The second user may then click the link (e.g., by a cursor, by a touchscreen, or the like) to be directed to the album.

Step 414 involves communicating a notification to the second user. The notification may inform the second user that an album has been shared with him and/or that content has been added to the album. The notification may be communicated over SMS email, social media, or the like.

Step 416 involves receiving at least one media item from the second user, autonomously selecting, using the media analysis module, at least one media item from the second user that satisfies the at least one received criteria, and autonomously transferring the at least one selected media item from the second user to the album. Accordingly, the sharing of media items may be bi-directional. The first user (or other users) may then also view the transferred media item(s).

Figure 5:
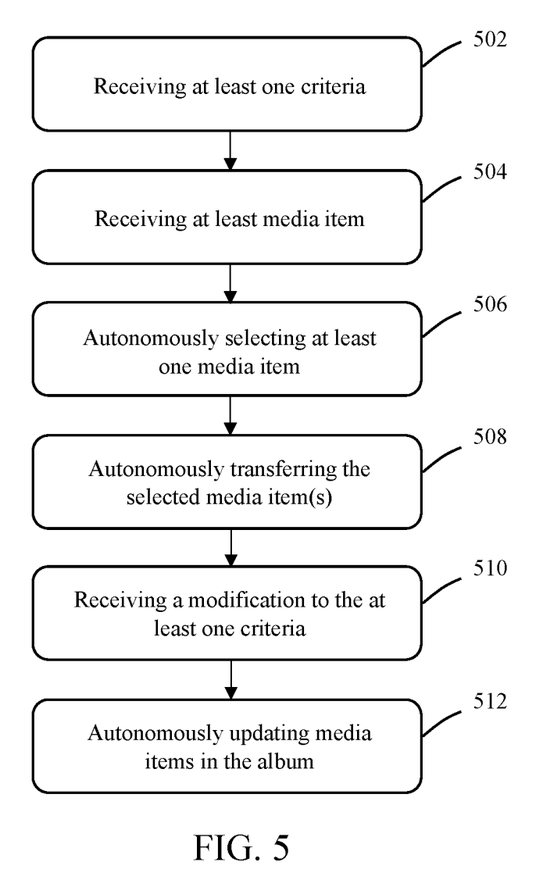
FIG. 5 depicts a flowchart of a method for organizing media in accordance with yet another embodiment.

FIG. 5 depicts a flowchart of a method for organizing media in accordance with another embodiment. Steps 502-508 are similar to steps 302-308 of FIG. 3 and are not repeated here.

Step 510 involves receiving a modification to the at least one criteria. The first user may provide this modification via a user interface executing on a user device. The modification may include a change to the desired person/people associated with media items, a change in the desired location associated with the desired media item, etc.

Step 512 involves autonomously updating the media items in the album based on the modification to the at least one criteria. The media items that satisfy the old criteria may not satisfy the modified criteria. Accordingly, the media analysis module may update the media items stored in the album for sharing.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for organizing media, the method comprising:
   receiving, using an interface, at least one criteria for selecting at least one media item from a first user, each criteria being associated with an album and defining an object to be present in a media item or an object to be absent from a media item;
   receiving, using the interface, at least one media item;
   autonomously selecting, using a media analysis module, at least one media item that satisfies the at least one received criteria based on a rules engine executing a machine learning algorithm, wherein the selected media item satisfies the criteria based on an object present in the media item or an item absent from the media item as specified by the criteria;
   autonomously transferring the at least one selected media item to the album associated with the satisfied criteria; and
   updating the machine learning algorithm based on user feedback to identify an object to be present in a media item, wherein the user feedback involves:
      a user adding an unselected media item that includes the object to be present to the album that was not previously transferred to the album, and
      the user providing a command to update the machine learning algorithm in response to a suggestion to update the machine learning algorithm that is communicated to the user after the user adds the unselected media item so that other media items that include the object to be present are also transferred to the album.

2. The method of claim 1 wherein the at least one criteria includes at least one of an event, a location, a time of interest, a date of interest, a calendar event, a person of interest, and an exclusion criteria.

3. The method of claim 1 wherein the at least one media item is a photograph or a video.

4. The method of claim 1 wherein the at least one media item is associated with a plurality of albums.

5. The method of claim 1 further comprising receiving contact information for a second user, wherein the contact information includes at least one of an email address, a social media username, and a telephone number.

6. The method of claim 5 further comprising sharing a link to the album with the second user.

7. The method of claim 5 further comprising communicating a notification to the second user indicating that the at least one selected media item has been transferred to the album.

8. The method of claim 5, further comprising:
   receiving at least one media item from the second user;
   autonomously selecting, using the media analysis module, at least one media item from the second user that satisfies the at least one received criteria; and
   autonomously transferring the at least one selected media item from the second user to the album.

9. The method of claim 1 further comprising autonomously identifying, using the media analysis module, a newly-received media item that satisfies the at least one received criteria, wherein the identified newly-received media item is autonomously transferred to the album.

10. The method of claim 9 wherein the newly-received media item is added to the album by a second user after the album is shared with the second user.

11. The method of claim 1 further comprising:
receiving, using the interface, a modification to the at least one criteria; and
autonomously updating which media items are in the album based on the modification to the at least one criteria.

12. A system for organizing media, the system comprising:
an interface configured to receive:
at least one media item, and
at least one criteria for selecting at least one media item from a first user, each criteria being associated with an album and defining an object to be present in a media item or an object to be absent from a media item as specified by the criteria;
a memory; and
a processor executing instructions stored on the memory to provide a media analysis module configured to:
autonomously select at least one media item that satisfies the at least one criteria based on a rules engine executing a machine learning algorithm, wherein the selected media item satisfies the criteria based on an object present in the media item or an item absent from the media item,
autonomously transfer the at least one selected media item to the album associated with the satisfied criteria, and
update the machine learning algorithm based on user feedback to identify an object to be present in a media item, wherein the user feedback involves:
a user adding an unselected media item that includes the object to be present to the album that was not previously transferred to the album, and
the user providing a command to update the machine learning algorithm in response to a suggestion to update the machine learning algorithm that is communicated to the user after the user adds the unselected media item so that other media items that include the object to be present are also transferred to the album.

13. The system of claim 12 wherein the at least one criteria includes at least one of an event, a location, a time of interest, a date of interest, an occasion, a calendar event, a person of interest, and an exclusion criteria.

14. The system of claim 12 wherein the at least one media item is a photograph or a video.

15. The system of claim 12 wherein the at least one media item is associated with a plurality of albums.

16. The system of claim 12 wherein the interface is further configured to receive contact information for a second user, wherein the contact information includes at least one of an email address, a social media username, and a telephone number.

17. The system of claim 16 wherein the interface is configured to share a link to the album with the second user.

18. The system of claim 16 wherein the interface is further configured to communicate a notification indicating that the at least one selected media item has been transferred to the album.

19. The system of claim 12 wherein the media analysis module is further configured to autonomously identify a newly-received media item that satisfies the at least one received criteria, wherein the identified newly-received media item is autonomously transferred to the album.

20. The system of claim 12, wherein the interface is further configured to receive a modification to the at least one criteria; and the media analysis module is configured to autonomously update which media items are in the album based on the modification to the at least one criteria.

* * * * *